US006991851B2

(12) United States Patent
Krepski et al.

(10) Patent No.: US 6,991,851 B2
(45) Date of Patent: Jan. 31, 2006

(54) DRY-PEELABLE TEMPORARY PROTECTIVE COATINGS

(75) Inventors: Larry R. Krepski, White Bear Lake, MN (US); Kevin M. Lewandowski, Inver Grove Heights, MN (US); Daniel E. Mickus, Mahtomedi, MN (US); Susan K. Rowen, Hudson, WI (US); Stephen A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 69 days.

(21) Appl. No.: 10/405,406

(22) Filed: Apr. 2, 2003

(65) Prior Publication Data

US 2004/0009354 A1 Jan. 15, 2004

Related U.S. Application Data

(63) Continuation-in-part of application No. 09/970,486, filed on Oct. 3, 2001, now abandoned.

(51) Int. Cl.
*B32B 27/40* (2006.01)

(52) U.S. Cl. ............... 428/423.1; 428/423.7; 428/424.4; 428/424.6; 428/424.7; 428/424.8; 428/425.6; 428/425.8; 428/425.1; 427/385.5

(58) Field of Classification Search ............. 428/423.1, 428/423.7, 424.2, 424.4, 424.6, 424.8, 425.6, 428/425.8, 425.1, 424.7; 427/385.5
See application file for complete search history.

(56) References Cited

U.S. PATENT DOCUMENTS

| | | | |
|---|---|---|---|
| 3,600,359 A | 8/1971 | Miranda et al. | |
| 3,700,643 A | 10/1972 | Smith et al. | |
| 3,941,733 A | 3/1976 | Chang | |
| 4,341,687 A | 7/1982 | Ozeki et al. | |
| 4,567,228 A | 1/1986 | Gaa et al. | |
| 5,041,494 A | 8/1991 | Franke et al. | |
| 5,081,174 A | 1/1992 | Van Buskirk | |
| 5,308,647 A | 5/1994 | Lappi | |
| 5,494,702 A | 2/1996 | Blaine et al. | |
| 5,554,686 A | 9/1996 | Frisch, Jr. et al. | |
| 5,639,814 A | 6/1997 | Van Buskirk et al. | |
| 5,698,626 A | 12/1997 | Chang | |
| 5,739,191 A | 4/1998 | Woodhall et al. | |
| 5,747,626 A | 5/1998 | Krepski et al. | |
| 5,753,774 A | 5/1998 | Chang | |
| 5,756,633 A | 5/1998 | Larson | |
| 5,919,860 A | 7/1999 | Roesler et al. | |
| 5,929,160 A | 7/1999 | Krepski et al. | |
| 5,945,462 A | 8/1999 | Salamon | |
| 5,965,195 A | 10/1999 | Müeller et al. | |
| 6,001,906 A | 12/1999 | Golumbic | |
| 6,111,010 A | 8/2000 | Yu et al. | |
| 6,117,485 A | 9/2000 | Woodhall et al. | |
| 6,124,044 A | 9/2000 | Swidler | |
| 6,172,126 B1 | 1/2001 | Müeller et al. | |
| 6,187,849 B1 | 2/2001 | Nugent, Jr. et al. | |
| 6,245,295 B1 * | 6/2001 | Chen et al. | .......... 422/48 |
| 2002/0077377 A1 | 6/2002 | Zhang et al. | |
| 2003/0144375 A1 * | 7/2003 | Wu et al. | ......... 523/160 |

FOREIGN PATENT DOCUMENTS

| | | |
|---|---|---|
| CA | 2314523 | 7/1999 |
| JP | 2000198921 | 7/2000 |

OTHER PUBLICATIONS

D. Dieterich, Prog. Org. Coat., 9, 281-340(1981).
J.W. Rosthauser and K. Nachtkamp, J. Coated Fabrics, 16, 39-79 (1986).
D. Dieterich and K. Uhlig, Ullmann's Encyclopedia of Industrial Chemistry, vol. A21, 665-716(1992).
S. Ramesh, K. Tharanikkarasu, G.N. Mahesh, and G. Radhakrishnan, J. Macro. Sci., Rev. Macromol. Chem. Phys., C38, 481-509 (1998).

* cited by examiner

*Primary Examiner*—Melanie Bissett
(74) *Attorney, Agent, or Firm*—Lorraine R. Sherman; Lucy C. Weiss

(57) ABSTRACT

A dry-strippable coating composition can be incorporated into a composite article and comprises a dried water-borne polyurethane dispersion including a release additive comprising a releasing co-solvent or other selected release material. When water is removed from the polyurethane dispersion of the composite article and when the article comprises a thermoformable substrate, the article can be thermoformed to provide a shaped article. Dry-stripping the coating composition from the substrate provides a thermoformed substrate and a thermoformed protective layer. The dry-strippable coatings provide temporary protection for the surface of various products and components during manufacture, assembly, shipping, installation, painting, and refinishing operations.

34 Claims, No Drawings

DRY-PEELABLE TEMPORARY PROTECTIVE COATINGS

STATEMENT OF PRIORITY

This application is a continuation-in-part of application Ser. No. 09/970,486 filed Oct. 3, 2001 abandoned, and claims the priority thereof.

FIELD OF THE INVENTION

This invention relates to coatings that are effective for protecting the surfaces of various substrates and are removable by stripping or peeling from the substrate. The removable coatings are also useful for the temporary protection of plastic parts prior to, during, and after thermoforming operations.

BACKGROUND OF THE INVENTION

Temporary protective coatings are widely used to protect the surfaces of various products, parts, or components during manufacture, assembly, shipping, installation, or refinishing operations. The temporary protective coatings are used to prevent damage from scratching, nicking, pitting, staining, corrosion, sticking, or discoloration. The protective coatings are also used to simplify or enhance cleaning operations whereby surface contamination is eliminated by removal of the temporary coating. Temporary coatings or "maskings" are also used during painting or refinishing operations of automobiles, for example, to prevent application of paint to areas not intended to be painted, and to prevent damage from paint overspray. Temporary protective coatings are also used during the transportation of various articles from a manufacturing site to a retail location. The surface finishes of new vehicles such as automobiles or boats must often be protected from abrasive particles or other deleterious conditions in the environment during shipment by road, rail, or sea.

Other products or articles that may be protected by temporary removable coatings include those with precision or high gloss surfaces such as mirrors, windows, optical lenses, plastics such as Plexiglas™, plastic laminates such as Formica™, composites such as Corian™ countertops, appliances, metal tools, parts, and machinery, and kitchen and bathroom fixtures such as sinks, bathtubs, and plumbing fixtures.

Temporary removable coatings may also be applied to various surfaces such as floors, countertops, showerstalls, appliances, and the like which tend to become contaminated with dirt, oil, or grease through normal use. In these applications, the temporary protective coating on the surface will become contaminated or dirty, and removal of the temporary protective coating eliminates the contamination, thereby greatly simplifying cleaning of the surface.

A number of approaches that utilize the application of a liquid solution or dispersion temporary protective coating composition have been described.

U.S. Pat. No. 4,341,687 describes a peelable, film forming paint comprising a mixture of an isocyanate functional prepolymer, a polyurethane resin, and ethylene glycol monoalkyl ether in a volatile organic solvent. The paint is useful for removing contamination from and protecting surfaces subject to contamination. No aqueous dispersions are disclosed.

There has been a move in recent years to avoid the use of volatile organic solvents (VOCs). Volatile organic solvents are often flammable and hazardous from a health and safety perspective. They are subject to increasingly stringent environmental regulations due to emission and disposal concerns. For these reasons, much effort has been expended in replacing organic solvent based adhesives, coatings, and sealers, for example, with water based systems.

U.S. Pat. No. 6,124,044 describes the use of aqueous emulsions of vinyl-acrylic copolymers and vinyl acetate ethylene emulsions to form barrier films on applied surfaces, the film being removable by peeling from the surface. The emulsion is said to be useful for protecting the exterior surfaces of automobiles and other products from damage.

U.S. Pat. No. 5,494,702 describes solvent-free aqueous based compositions for protecting surfaces from paint in painting operations. The compositions comprise polyvinyl alcohol, a plasticizer, and a surfactant in water. After the painting operation, the protective composition is removed by washing with a pressurized stream of water or by scrubbing.

Other compositions for protecting surfaces during painting operations and that are removed by washing with water have been described. U.S. Pat. No. 5,308,647 describes compositions comprising film forming thickeners, surfactants, and polyglycerols in water.

U.S. Pat. No. 6,117,485 describes the use of compositions comprising dextrin, a plasticizer, and water for temporary masking operations. No peelable coatings are disclosed.

U.S. Pat. Nos. 5,081,174, 5,639,814 and 6,187,849 B1 describe weldable, protective coatings for use on metal. The coatings comprise neutralized acrylic polymers and wax lubricants. The coatings are removed by washing with an aqueous acid or alkaline cleaning solution.

U.S. Pat. No. 5,945,462 describes the use of aqueous based compositions comprising polymerizable acrylic functional urethane prepolymer resins containing a photoinitiator and a release agent which are irradiated with UV radiation to photocrosslink the prepolymer resins to form strippable, protective coatings. The release agents include lecithin, polyethylene glycols, and fatty acids.

Canadian Patent Application CA 2,314,523 describes strippable coating compositions for temporary protection purposes. The compositions comprise at least two different aqueous anionic dispersions of polyurethane polyureas wherein the films resulting from drying the dispersions have glass transition temperatures in the range of −30° C. to −45° C. The coating composition is stated to be co-solvent free.

U.S. Pat. Nos. 5,965,195 and 6,172,126 B1 describe strippable coating compositions comprising organic solvent-free aqueous, anionic dispersions of polyurethane polyureas derived from a prepolymer prepared from diisocyanates, polyols, a 2,2-bis(hydroxymethyl)alkane monocarboxylic acid, a monofunctional chain terminating agent, water, and a neutralizing agent, with the specific provisions that the NCO content of the prepolymer is up to 25% lower than the theoretical value. The entire synthesis is performed in the homogeneous phase, and no solvent having a boiling range of greater than 100° C. is used during the preparation of the dispersion. The coating composition is stated to be co-solvent free.

SUMMARY OF THE INVENTION

Briefly, the present invention provides a process comprising the step of providing a composite article comprising 1) a nonporous substrate having on at least one surface thereof, 2) a strippable protective dried water-borne polyurethane coating composition that is free of foam, said polyurethane being free of polymerizable acrylate functionality, said composition comprising one or both of (a) a releasing co-solvent having a boiling point greater than 100 degrees C., and (b) a dispersion of a metal salt of stearic acid or a dispersion of a wax, said polyurethane coating composition being a film. The coating can be removed from the substrate by stripping it from the substrate in the absence of a stripping solvent. Preferably, the releasing co-solvent has a boiling point greater than 110° C. and more preferably greater than 150° C., and most preferably greater than 200° C.

It has now been found that the addition of releasing co-solvents having a boiling point greater than 100° C. or certain other release additives to aqueous polyurethane dispersions provides a coating composition effective for the temporary protection of the surfaces of various products or components. The coatings are applied in liquid form in water dispersion without substantial amounts, i.e., no more than 25 weight percent, of organic solvents and form a protective coating when the water evaporates or is removed. The resulting protective coatings can be removed by stripping or peeling from the surface without the need for the application of an aqueous or non-aqueous stripping or washing solution. The removable coatings are also useful for the temporary protection of sheets of metal or plastic parts, after which the coatings may be removed by peeling.

In another aspect, the present invention provides an additional process step when the substrate is a plastic part wherein the composite article is thermoformed prior to stripping the protective layer from the substrate. The coating of the invention provides temporary protection for the substrate during the thermoforming step after which the coating may be removed by peeling.

In a further aspect the present invention provides a dry-strippable coating composition comprising a dried water-borne polyurethane composition, said polyurethane being free of polymerizable acrylate functionality, including a release additive comprising a releasing co-solvent having a boiling point greater than 100 degrees C. or certain other release additives, all preferably being selected from the group consisting of hydrophilic polyols such as glycerol, oligomers of glycerol, ethers and esters of ethylene glycol, polyethylene glycol, ethers and esters of polyethylene glycol, pentaerythritol ethoxylate, as well as other release additives such as castor oil, sulfonated castor oil, dispersions of metal salts of stearic acid, ethoxylated polydimethylsiloxane, and dispersed waxes, the dispersions preferably being aqueous dispersions.

In a yet another aspect, the present invention provides a composite article comprising 1) a nonporous substrate having on at least one surface thereof 2) a dry-strippable protective layer comprising a dried water-borne polyurethane composition comprising a releasing co-solvent having a boiling point greater than 100 degrees C. or other release additive, all being selected from the group consisting of glycerol, oligomers of glycerol, ethers and esters of ethylene glycol, ethers and esters of polyethylene glycol, pentaerythritol ethoxylate, caster oil, sulfonated castor oil, metal salts of stearic acid, ethoxylated polydimethylsiloxane, and dispersed waxes.

Aqueous polyurethane dispersions that are useful in the present invention include the well-known carboxylate or sulfonate functional polyurethane-ureas that are prepared from diisocyanates, polyols, and carboxylic acid or sulfonic acid containing diols. Cationic polyurethane-ureas, which contain quaternary ammonium groups in their backbone, are also useful in the present invention. Other types of aqueous polyurethane dispersions useful in the present invention are the non-ionic polyurethane-ureas that contain no ionic groups but contain hydrophilic groups such as polyethylene oxide chains in their structure.

Releasing co-solvents having a boiling point greater than 100° C. include hydrophilic polyols, preferably glycerol and oligomers of glycerol, as well as certain other release additives, that may be added to the aqueous polyurethane dispersions to render the coating removable.

The releasing co-solvent or other release additive is added to the aqueous polyurethane dispersion in an amount of about 0.5 to 20 weight percent, preferably 5 to 10 weight percent, relative to the weight of the solids in the polyurethane dispersions.

Particularly preferred types of aqueous polyurethane dispersions useful in the present invention include polyurethanes terminated with one or more silyl groups such as the silyl terminated sulfopoly(ester-urethanes) described in U.S. Pat. Nos. 5,747,626, 5,756,633, and 5,929,160.

In general, the aqueous polyurethane dispersions described above form films or coatings that characteristically demonstrate excellent clarity, toughness, strength, abrasion resistance, and weatherability. Preferably, the coatings are colorless. They also usually exhibit excellent adhesion to a variety of substrates, and therefore it is surprising that the addition of releasing co-solvents or certain other release additives to the dispersion provides a coating that can be peeled from the substrate without tearing.

Glycerol and oligomers of glycerol are preferred releasing co-solvents. In this application:

"film" means a polymeric thin skin or sheet free of foam;

"foam" means a frothy mass of bubbles;

"glycerol" and "oligomers of glycerol" mean glycerol, diglycerol, and other polyglycerols;

"group" or "compound" or "polymer" means a chemical species that allows for substitution or which may be substituted by conventional substituents which do not interfere with the desired product; e.g., substituents can be alkyl, alkoxy, aryl, phenyl, cyano, etc.;

"molecular weight" means the sum of the atomic weights of all atoms in a group of atoms or in a segment of a polymer and under circumstances where the group or segment may be a mixture of two or more groups or segments is the number average of molecular weights of the groups or segments;

"nonporous" means a material not allowing components of the polyurethane composition to migrate into the substrate;

"peelable," "strippable," or "dry-strippable" coating means one that may be removed from the surface it coats simply by mechanical peeling. A "peelable" coating possesses sufficient flexibility, tensile and tear strength so that it does not fracture during peeling. In a preferred embodiment, the adhesive ability of the coating is sufficient to keep it completely bound to the underlying substrate throughout the period of protection and yet remains fully peelable at the time of removal. It is particularly preferred that the peelable coating strip without trouble or without being torn in pieces. A useful coating when peeled should not remain partially unpeeled, leaving portions adhering to the substrate;

"plastic" means any of various organic compounds produced by polymerization, capable of being molded, cast into various shapes and films, or drawn into filaments used as textile fibers; materials that are thermoplastic are included;

"polymer" includes oligomers;

"releasing co-solvent" means a substance that controls or minimizes the adhesion between two surfaces; it imparts the property of strippability to a coating (film) and has a boiling point greater than 100 degrees C., preferably greater than 110 degrees C., and more preferably greater than 150 degrees C., and preferably a melting point of at most 60 degrees C.;

"silyl group" means $Si(Q)_p(OQ)_{3-p}$ where p=0, 1, or 2 wherein each Q independently can be hydrogen or a lower alkyl group having 1 to 4 carbon atoms such that an OQ group in which Q is a lower alkyl group is the hydrolyzable unit;

"sulfo group" or "sulfonate group" or "sulfonic acid group or salt thereof" means a —$SO_3M$ group where M can be H or a cation, preferably an alkali metal ion;

"sulfopolyol" means a symmetric or asymmetric compound or polymer or a random polymer comprising at least one sulfo group, at least two hydroxyl groups, optionally containing other functional groups such as ester, ether, urea, urethane, and thiocarbamate;

"sulfopolyester polyol" or "sulfoester polyol" means a symmetric or asymmetric polymer or a random polymer comprising at least one sulfo group, at least two ester groups, at least two hydroxyl groups, optionally containing other functional groups such as ester, ether, urea, urethane, and thiocarbamate; and "sulfopoly(ester-urethane)" means a symmetric or asymmetric polymer or a random polymer comprising at least one sulfo group, at least two ester groups and at least one urethane group, optionally containing other functional groups such as ether, carbonate, urea, and thiocarbamate.

The present invention provides water-borne polyurethane compositions that can be used as temporary protective coatings. Preferably, the polyurethane compositions are water dispersible poly(ester-urethane) or sulfopoly(ester-urethane) compositions all of which optionally are functionalized with silyl groups. The addition of releasing co-solvents or certain release additives to aqueous polyurethane dispersions provides peelable coatings that are dry strippable from a substrate without the need for any type of aqueous or non-aqueous stripping or washing solution. The coating is applied to a substrate in water dispersion without substantial amounts of organic solvents (i.e., using no more than 25 weight percent organic solvents based on the total composition weight) and forms a protective coating when the water is removed. The coating compositions of the present invention can be applied using conventional coating techniques such as dipping, knife coating, pouring, spraying, atomization, brushing, or roller application. The dry-strippable coatings are also useful for the temporary protection of plastic parts or articles, preferably in sheet form, prior to thermoforming operations, after which the coating can be removed by peeling. Useful dry coating thicknesses are in the range of 2.0 to 1500 micrometers, preferably 2.0 to 500 micrometers, more preferably 5.0 to 250 micrometers. It is to be appreciated that for specific uses such as small electronics, e.g. cell phone covers, pagers, and transmitters, thickness of 2.0 to 20 micrometers can be preferred. Major appliances such as refrigerators, cars, and dishwashers, and sporting goods such as helmets, goggles, skis, golf clubs, and the like, preferably can have coatings of thicknesses in the range of 50 to 300 micrometers.

High gloss plastic durable sheet goods can be produced by thermoforming and are subject to damage of the plastic surface caused by contact with the thermoforming mold. Slight imperfections in the mold can result in nicks, gouges, bubbles, deformations, scratches, or reduction of gloss of the plastic surface of the thermoformed part. One way to prevent this damage during thermoforming is to protect the surface of the plastic to be thermoformed by coating it with a temporary protective coating that will survive the thermoforming operation and be removable from the thermoformed article after the thermoforming operation. The protective coating is in intimate contact with the substrate to provide a uniform, defect-free thermoformed surface on the substrate.

The polyurethane coating compositions of the present invention are effective for the temporary protection of surfaces of various products, parts, or components during manufacture, assembly, shipping, installation or refinishing operations. These coating compositions, when used on thermoformable substrates, such as sheets of plastic, and subjected to thermoforming conditions, can produce shaped thermoformed articles. Dry-stripping of the protective coating composition produces a shaped substrate and a protective layer.

DETAILED DESCRIPTION OF PREFERRED EMBODIMENT OF THE INVENTION

The present invention provides coatings and a process therefore that are effective in protecting the surfaces of various products or components and are removable by stripping or peeling from the surface without the need for any type of aqueous or non-aqueous stripping or washing solution. The coatings are derived from aqueous polyurethane solutions or dispersions to which an effective amount of a release additive has been added. The coatings are applied in liquid form in water solution or dispersion and form the removable protective coating when the water evaporates or is removed. The removable coatings are also useful for protecting the surfaces of plastic substrates prior to thermoforming operations. After thermoforming, the temporary protective coating may be removed from the substrate by dry-peeling or stripping from the surface of the thermoformed article.

One plastic that is widely used for thermoforming into useful articles is high impact polystyrene (HIPS). Articles produced by thermoforming HIPS include, for example, disposable food service containers, lunch trays, drinking cups, domes, lids, and covers. A plastic that is especially useful for thermoforming is acrylonitrile-butadiene-styrene (ABS) polymer. The physical properties of ABS are superior to HIPS and most other thermforming materials. Because of its excellent chemical resistance, good low temperature impact strength, high gloss, and ability to accept electroplating, ABS is widely used for manufacturing durable goods and large appliance parts such as refrigerator door liners, automobile, boat, and recreational vehicle parts, and luggage exteriors. Other plastics that are useful for thermoforming include high density polyethylene, polypropylene, crystallized poly(ethylene terephthalate) (CPET), poly(ethylene terephthalate) copolymer (PETG), polycarbonate, polycarbonate-polyetherimide, poly(methyl methacrylate) (PMMA), poly(vinyl chloride) (PVC), poly(ethylene naphthalenedicarboxylate), and cellulosics such as cellulose acetate, cellulose acetate butyrate, and cellulose propionate.

The aqueous polyurethane dispersions that are useful in the present invention include the well known carboxylate or sulfonate functional polyurethanes-ureas that are prepared from diisocyanates, polyols, and carboxylic acid or sulfonic acid containing diols. Cationic polyurethane-ureas, which contain quaternary ammonium groups in their backbone, are also useful in the present invention. Other types of aqueous polyurethane dispersions useful in the present invention are the non-ionic polyurethane-ureas that contain no ionic groups but contain hydrophilic groups such as polyethylene oxide chains in their structure. The preparation and description of these aqueous polyurethane dispersions is well known and is described in a number of reviews, for example, D. Dieterich, *Prog. Org. Coat.*, 9, 281–340 (1981); J. W. Rosthauser and K. Nachtkamp, *J. Coated Fabrics*, 16, 39–79 (1986); D. Dieterich and K. Uhlig, in *Ullmann's Encyclopedia of Industrial Chemistry*, Volume A21, 665–716 (1992); S. Ramesh, K. Tharanikkarasu, G. N. Mahesh, and G. Radhakrishnan, *J. Macro. Sci., Rev. Macromol. Chem. Phys.*, C38, 481–509 (1998). The polyurethane dispersions useful in the invention do not contain polymerizable acrylate functionality.

More particularly, the polyurethanes or polyurethane prepolymers are prepared by methods well known in the art and involve the reaction of polyisocyanates, especially diisocyanates, with polyols, especially diols, wherein a portion of the diol charge may consist of diols which contain ionic or potentially ionic groups, optionally in the presence of other isocyanate reactive monomers such as diamines or bismercaptans. The reaction is generally carried out in a water soluble organic solvent unreactive with an isocyanate such as acetone, methyl ethyl ketone (MEK), tetrahydrofuran, and N-methyl pyrrolidinone, wherein the solubility in water is at least 10 weight percent. The total concentration of polyisocyanates and polyols (optionally any of other different polyamines, or polythiols) is generally desirable to be quite high such as at least 30 weight percent, preferably greater than at least 50 weight percent. High monomer concentrations and elevated reaction temperatures of from 50° to 110° C. are desirable so that high conversions of monomers to polymer can occur in a reasonable time, e.g., less than eight hours, preferably less than three hours. Catalysts may be employed such as metal salts including dibutyltin dilaurate and dibutyltin diacetate, and amines, such as triethylamine, DBU (1,8-diazabicyclo[5.4.0]undec-7-ene) and DABCO (1,4-diazabicyclo[2.2.2]octane), in useful concentrations of from 0.01 to 1.0 mole percent (relative to the isocyanate reagent).

Representative polyisocyanates that can be used to react with the polyols are any of the well-known aliphatic and aromatic polyisocyanates. Useful polyisocyanates include hexamethylene diisocyanate, toluene diisocyanate, isophorone diisocyanate (3,5,5-trimethyl-1-isocyanato-3-isocyanatomethylcyclohexane), bis(4-isocyanatocyclohexyl)methane, 1,3-bis(isocyanatomethyl)cyclohexane, 1,3-bis(1-isocyanato-1-methylethyl)benzene, 4,4'-diphenylmethane diisocyanate (MDI), tetramethylxylylenediisocyanate, 4,4', 4"-triisocyanatotriphenylmethane, and the polymethylenepolyphenylisocyanates. Other polyisocyanates are well known and include those described in U.S. Pat. Nos. 3,700,643 and 3,600,359, among many others, which are incorporated herein by reference. Mixtures of polyisocyanates can also be used such as Isonate™ 2143L, available from Dow Chemical Company (Midland, Mich.). The aliphatic polyisocyanates are preferred.

Polyols containing ionic or potentially ionic groups include sulfonated polyester diols such as those described in U.S. Pat. Nos. 5,747,626, 5,756,633, 5,929,160, and the sulfonated polyester Rucoflex™ polyols, such as Rucoflex XS-5483 and XS-5536, available from the Ruco Polymer Corporation (Hicksville, N.Y.), N,N-bis(2-hydroxyethyl)-2-aminoethanesulfonic acid, and 3-hydroxy-2-hydroxymethylpropane-sufonic acid. Other useful sulfonated polyols include those derived from the addition of bisulfite to ethylenically unsaturated polymeric precursors as described in U.S. Pat. Nos. 5,698,626 and 5,753,774. Examples of polyols containing carboxylate ionic groups include dihydroxypropionic acid, dimethylolpropionic acid, dimethylolbutyric acid, dihydroxysuccinic acid, and dihydroxybenzoic acid. The sulfo and carboxyl groups in these monomers may also be present in the form of their alkalai metal salts such as lithium, sodium, or potassium salts, or amine salts. Other examples of suitable monomers containing potentially ionic groups include amino alcohols containing tertiary amine nitrogens which may be converted at least partly into quaternary ammonium groups by reaction with, for example, methyl iodide or dimethyl sulfate such as N-methyl diethanolamine and 1,4-bis(2-hydroxyethyl)piperazine.

The exact nature and relative amounts of the other polyols which may be incorporated can be varied to change the properties of the final films. Suitable diols include ethylene glycol, propylene glycol, neopentyl glycol, 2-butyl, 2-ethyl-1,3-propanediol, polypropylene glycol, polyethylene glycol, polyester diols such as polycaprolactone diol, and polyether diols such as polytetramethylenediol and polycarbonate diols such as PC-1122™ PC-1667™, and PC-1733™, available from Stahl USA, Peabody, Mass. Properties that can be varied include ductility, water uptake, tensile strength, modulus, abrasion resistance, minimum film formation temperature, and glass transition temperature. Longer chain polyols tend to provide materials which are more ductile and having lower Tg, whereas shorter chain polyols tend to contribute to high modulus, greater tensile strength, and having high Tg materials. Aliphatic polyols tend to provide materials with decreased water uptake whereas diols containing heteroatoms in the backbone tend to have increased water uptake.

Useful optional polyamines include: ethylenediamine, 1,6-diaminohexane, piperazine, tris(2-aminoethyl)amine, and amine terminated polyethers such as those marketed under the Jeffamine trademark by the Huntsman Corporation (Salt Lake City, Utah). Useful polythiols include 1,2-ethanedithiol, 1,4-butanedithiol, 2,2'-oxytris(ethane thiol), and di- and trimercapto propionate esters of poly(oxyethylene) diols and triols.

Aqueous polyurethane dispersions are available from a number of suppliers and include, for example the Bayhydrol™ products such as Bayhydrol 110, Bayhydrol 121, Bayhydrol 123, Bayhydrol 140AQ, Bayhydrol DLN, and Bayhydrol PU-402A (available from Bayer Corporation, Pittsburgh, Pa.), the NeoRez™ polyurethane dispersions such as NeoRez R-960, NeoRez R-972, NeoRez R-9649, NeoRez R-9637, and NeoRez R-9679 (available from Neo-Resins, Wilmington, Mass.), and the Witcobond™ polyurethane dispersions such as Witcobond W-232, Witcobond W-505, and Witcobond W-507 (available from Crompton Corporation, Greenwich, Conn.).

The general preparation of the silyl terminated polyurethanes is similar to that described above for the non-silyl terminated polyurethanes with regard to reaction conditions, useful monomers, and catalysts. In the preparation of a silyl terminated polyurethane, the polyisocyanates can be reacted in greater than stoichiometric amount relative to the polyols (including polyamines and polythiols). This results in a isocyanate functional polymer that can be reacted with an nucleophilic, hydrolyzable silane reagent such as 3-aminopropyltriethoxysilane, 3-N-methylaminopropyltrimethoxysilane, 3-mercaptopropyltrimethoxysilane, 3-hydroxypropyltriethoxysilane, and bis(triethoxysilyl propyl)amine. Alternatively, the polyisocyanates can be reacted in less than stoichiometric amount relative to the polyols (including polyamines and polythiols). This results in a hydroxy, amino, or mercapto functional polymer which can be reacted with an electrophilic, hydrolyzable silane reagent such as 3-isocyanatopropyltriethoxysilane, 3-glycidoxypropyltrimethoxysilane, and 3-chloropropyltriethoxysilane.

Other types of aqueous polyurethane dispersions that are useful in the present invention include the polyurethanes terminated with one or more silyl groups such as the silyl terminated polyurethanes described in U.S. Pat. Nos. 5,554,686 and 3,941,733. Additional silyl functional polyurethanes are described in U.S. Pat. Nos. 4,567,228, 5,041,494, 5,919,860, and 6,111,010.

It has now been found that the addition of glycerol or certain other releasing co-solvents or release additives to aqueous polyurethane dispersions provides a coating composition effective for the temporary protection of surfaces of various products or components. The coatings are applied in liquid form in water dispersion without substantial amounts of organic solvents and form the protective coating when the water is removed or evaporates. The protective coatings can be removed by stripping or peeling from the surface without the need for any type of aqueous or non-aqueous stripping or washing solution. The removable coatings are also useful for the temporary protection of plastic parts prior to, during, and after thermoforming operations, after which the coatings may be removed by peeling.

In addition to glycerol, other releasing co-solvents including hydrophilic polyols that have boiling points greater than 100° C. may be added to the aqueous polyurethane dispersions to render the coatings removable. These include higher oligomers of glycerol such as diglycerol, triglycerol, and hexaglycerol, ethers and esters of ethylene glycol such as ethylene glycol monobutyl ether, polyethylene glycol of molecular weights about 150 to 8000, ethers and esters of polyethylene glycol such as polyethylene glycol methyl ether of molecular weights about 150 to 8000, and pentaerythritol ethoxylate of molecular weights about 250 to 1000. In addition to these hydrophilic polyols, other useful release additives include mold release additives that are soluble or dispersible in water such as castor oil, sulfonated castor oil, metal salts of stearic acid, ethoxylated polydimethylsiloxanes, and dispersed waxes.

Glycerol and oligomers of glycerol are preferred releasing co-solvents. Triglycerol and hexaglycerol are available from Hexagon Enterprises, Inc., Mountain Lakes, N.J., under the tradenames Hexapol™ G-3 and Hexapol G-6, respectively. Hexapol G-3 has the following approximate composition: glycerol, 13%; diglycerol, 17%, triglycerol, 51%, tetraglycerol, 11%; pentaglycerol, 5%; other glycerols, remainder. Hexapol G-6 has the following approximate composition: diglycerol, 6%, triglycerol, 28%, hexaglycerol, 64%; other glycerols, remainder. Advantages of these release additives are that they dissolve or disperse readily in the aqueous polyurethane dispersion and generally result in clear, defect free coatings.

The releasing co-solvents or other release additives are added to the aqueous polyurethane dispersion in about 0.5 to 20 weight percent, preferably 5 to 10 weight percent, relative to the weight of the solids in the polyurethane dispersions.

The releasing co-solvent or other release additive may be added to the preformed aqueous polyurethane dispersion. Alternatively, the release additive may be added to a solution of the polyurethane before the polyurethane is dispersed in water. For example, if a polyurethane is prepared by the acetone process, wherein the polyurethane is prepared in acetone solution, water is added, and finally acetone is removed to leave the polyurethane dispersed in water, the release additive may be added to the acetone solution of the polyurethane. Water may then be added and acetone removed from the mixture to leave the aqueous dispersion of the polyurethane and the release additive. When a polyurethane is prepared by first preparing a prepolymer, and then chain extending this polyurethane prepolymer in water containing diamines, for example, the release additive may be added to the mixture of water and chain extender agent used to chain extend the prepolymer and form the polyurethane dispersion.

The coating compositions of the present invention are applied using conventional coating techniques by dipping, knife coating, pouring, spraying, atomization, brushing, or roller application.

Temporary protective coatings are also useful for various aspects of polymer processing, for example, in thermoforming of plastic sheets into useful articles. Thermoforming is the process of manufacturing products from thermoplastic sheets, whereby the plastic sheet is heated to its softening point, formed in a mold by the action of pressure or vacuum into the desired shape, and can then be separated from the mold.

Substrates useful as carriers for the protective coatings of the present invention include plastics, metals, glass, and ceramics. If the articles are to be thermoformed, plastic substrates are useful.

The temporary protective coatings of the invention are useful to protect the surfaces of various products, parts, or components during manufacture, assembly, shipping, installation, refinishing or painting operations. The temporary protective coatings are used to prevent damage from scratching, nicking, pitting, staining, corrosion, or discoloration or to simplify or enhance cleaning operations whereby surface contamination is removed by stripping the temporary coating. Temporary coatings or "maskings" are also used during painting or refinishing operations of automobiles, for example, to prevent application of paint to areas not intended to be painted, and to prevent damage from paint overspray.

Other products or articles that may be protected by temporary coatings of the present invention include products with high gloss surfaces such as sealed wood, mirrors, windows, optical lenses, plastics such as Plexiglas, plastic laminates such as Formica, composites such as Corian countertops, appliances, metal tools, stamped or formed metal parts, and machinery, and kitchen and bathroom fixtures such as sinks, bathtubs, and plumbing fixtures.

Thermoformed parts or articles can be protected from slight imperfections in a mold that can result in nicks, gouges, scratches or reduction of gloss of plastic surfaces of the thermoformed product by use of the temporary protective thermoformable coatings of the present invention. Stripping of the coating provides two articles, the shaped thermoformed substrate and the thermoformed self-supporting coating.

The present invention also allows for artwork, intricate designs, decals or special appearance promoters such as metallic chips, paint, or glitter to be adhered to the surface, topcoated with the protective coating and further thermoformed. It is to be appreciated that metal parts can be protected with the peelable coating of the invention prior to stamping, bending, or forming operations.

Polymeric films of the present invention which are thin skins, free of foam, whether single- or multi-layer, are widely used in a broad range of industrial and consumer applications and may benefit from the temporary protective coatings of the present invention. Such films, for example, can be employed as transparent or tinted barrier films to protect myriad underlying substrates. Among other properties, they exhibit clarity, durability, toughness, pliability, formability and affordability. Depending on the desired properties of the polymeric film, it may be desirable to orient the film by stretching. Typically, a polymeric film is oriented in either or both the lengthwise (sometimes referred to as machine) direction and the transverse (or cross-machine) direction. Although the degree of orientation in either direction can vary greatly (and are not necessarily the same), typically the oriented film dimensions in both directions vary between 2.0 and 5.0 times the films original dimensions.

Often times these polymeric films require a temporary protective layer which prevents damage to the surface of one or both faces of the film. These temporary protective layers typically consist of some form of polyethylene liner of about 50 micrometer (2 mil) thickness which is applied just prior to winding the film into stockroll form. Besides being somewhat cumbersome to work with, which can limit the caliper and/or length of a given stockroll, liners have also been known to cause static issues, web handling difficulties, and/or create unwanted patterns in the film. Finally, these liners can add substantial cost to the price of the film.

The present invention provides a method for eliminating the need for these liners by the application of a temporary protective coating to the film. These coatings can be applied in-line or off-line. These coatings can also be applied to the film before or after orientation. In some instances, these coatings can be subjected to the high temperature conditions associated with heat-setting films and continue to exhibit the ability to be peeled from the film.

Objects and advantages of this invention are further illustrated by the following examples, but the particular materials and amounts thereof recited in these examples, as well as other conditions and details, should not be construed to unduly limit this invention.

In the Examples, the glass transition temperatures are reported as the midpoint of the change in specific heat over the transition range using an average sample heating rate of 5° C./min. The tensile properties were obtained from sample specimens with gauge lengths of 1.43 cm (0.562 inches) and strain rates of 2.54 cm/min. (1 in./min.).

Preparation A—Preparation of Sulfopolyester Diol Precursor

A mixture of dimethyl 5-sodiosulfoisophthalate (DMS-SIP, 337.3 g, 1.14 mol, available from E. I. DuPont de Nemours, Wilmington, Del.), diethylene glycol (DEG, 483 g, 4.55 mol, available from Aldrich Chemical Co., Milwaukee, Wis.), and zinc acetate, (0.82 g, available from Aldrich) was heated to 180° C. and the methanol by-product was distilled from the reaction mixture. After 4.5 hours NMR analysis of the reaction product showed that less than 1% residual methyl ester was present in the product.

Dibutyltin dilaurate (1.51 g, 2.4 mmol, available from available from Alfa Chemical Co., Ward Hill, Mass.) was added to the above reaction product, the temperature held at 180° C., and epsilon-caprolactone (1753 g, 15.36 mol, available from Union Carbide Corp., Danbury, Conn.)) was added portionwise over about a 30 minute period. When addition was complete, the reaction mixture was held at 180° C. for 4 hours, then cooled to afford the desired product.

Determination of the hydroxyl equivalent weight of the reaction product was as follows. A 4.81 g sample of the product mixture was dissolved in 20 mL of methyl ethyl ketone, isophorone diisocyanate (2.08 g, 9.36 mmol, available from Aldrich), and dibutyltin dilaurate (0.02 g) added, and the solution heated 4 hours at 80° C. The solution was cooled to room temperature, a solution of dibutyl amine (4 mL of a 1.71 molar solution in methyl ethyl ketone) was added, and the solution was stirred for 15 minutes. Then 20 mL of methanol and 4–5 drops of Bromophenol Blue indicator were added, and the solution was titrated to a yellow endpoint with 1.87 mL of a 1.0 molar hydrochloric acid solution in water. This corresponded to a hydroxyl equivalent weight of 349.

Preparation B—Preparation of Silyl Terminated Sulfo(polyester-urethane) with Tg of 30° C.

The sulfopolyester diol of Preparation A with a hydroxyl equivalent weight of 349 (425.8 g, 0.61 mol), polycaprolactonediol (157.2 g, 0.30 mol, PCP 0201™, average molecular weight 524, available from Union Carbide Corp., Danbury, Conn.), ethylene glycol (74.5 g, 1.20 mol), and isophorone diisocyanate (505.7 g, 2.28 mol, available from Huls America, Inc., Piscataway, N.J.), dibutyltin dilaurate (0.80 g, 1.2 mmol, available from Alfa Chemical Co., Ward Hill, Mass.) were dissolved in methyl ethyl ketone (626 g). The solution was stirred at 80° C. for 3.5 hours, then an aliquot was removed for titration as described in Preparation A. The isocyanate equivalent weight of the product was determined to be 3245. Methyl ethyl ketone (610 g) and 3-aminopropyltriethoxysilane (76.7 g, 0.35 mol, available from Aldrich) were added and the solution was stirred 15 minutes at 80° C. Water (1240 g) was then added to the reaction mixture over about a 5 minute period and methyl ethyl ketone was distilled from the mixture under reduced pressure to produce a dispersion (48% solids) of silyl terminated sulfo(polyester-urethane) in water. Modulated Differential Scanning Calorimetry (MDSC) and tensile property analyses made of a spun cast film produced from the dispersion indicated that the polymer had a Tg of 30° C. and a tensile strength of 31.3 MPa (4549 psi) at 345% elongation.

Preparation C—Preparation of Silyl Terminated Sulfo(polyester-urethane) with Tg of 12° C.

A silyl terminated sulfo(polyester-urethane) was prepared substantially according to the procedure of Preparation B except that the reagents were charged as follows:

The sulfopolyester diol of Preparation A with a hydroxyl equivalent weight of 333 (370.6 g, 0.56 mol), polycaprolactonediol (PCP 0201™, 170.3 g, 0.32 mol), ethylene glycol (44.9 g, 0.72 mol), isophorone diisocyanate (395.6 g, 1.78 mol), and 3-aminopropyltriethoxysilane (78.6 g, 0.36 mol) were allowed to react. Modulated Differential Scanning Calorimetry (MDSC) and tensile property analyses made of a spun cast film produced from the dispersion indicated that the polymer had a Tg of 12° C. and a tensile strength of 20.3 MPa (2945 psi) at 418% elongation.

Preparation D—Preparation of Silyl Terminated Sulfo(polyester-urethane) with Tg of 22° C.

A silyl terminated sulfo(polyester-urethane) was prepared substantially according to the procedure of Preparation B except that the reagents were charged as follows:

The sulfopolyester diol of Preparation A with a hydroxyl equivalent weight of 335 (368.5 g, 0.55 mol), polycaprolactonediol (PCP 0201™, 167.7 g, 0.31 mol), ethylene glycol (49.7 g, 0.80 mol), isophorone diisocyanate (401.8 g, 1.81 mol), and 3-aminopropyltriethoxysilane (56.7 g, 0.26 mol) were allowed to react. Modulated Differential Scanning Calorimetry (MDSC) and tensile property analyses made of a spun cast film produced from the dispersion indicated that the polymer had a Tg of 22° C. and a tensile strength of 27.9 MPa (4045 psi) at 395% elongation.

Preparation E—Preparation of Silyl Terminated Sulfo(polyester-urethane) with Tg of −15° C.

A silyl terminated sulfo(polyester-urethane) was prepared substantially according to the procedure of Preparation B except that the reagents were charged as follows:

The sulfopolyester diol of Preparation A with a hydroxyl equivalent weight of 370 (555 g, 0.75 mol), polycaprolactonediol (PCP 0201™, 393 g, 0.75 mol), isophorone diisocyanate (375.1 g, 1.69 mol), and 3-aminopropyltriethoxysilane (80.5 g, 0.36 mol) were allowed to react. Modulated Differential Scanning Calorimetry (MDSC) and tensile property analyses made of a spun cast film produced from the dispersion indicated that the polymer had a Tg of −15° C. and a tensile strength of 6.3 MPa (917 psi) at 462% elongation.

Preparation F—Preparation of Silyl Terminated Sulfo(polyester-urethane) with Tg of 47° C.

A silyl terminated sulfo(polyester-urethane) was prepared substantially according to the procedure of Preparation B except that the reagents were charged as follows:

The sulfopolyester diol of Preparation A with a hydroxyl equivalent weight of 370 (388.5 g, 0.53 mol), polycaprolactonediol (PCP 0201™, 52.4 g, 0.10 mol), ethylene glycol (74.5 g, 1.2 mol), diethylene glycol (31.8 g 0.30 mol), isophorone diisocyanate (503.9 g, 2.27 mol), and 3-aminopropyltriethoxysilane (66.0 g, 0.30 mol) were allowed to react. Modulated Differential Scanning Calorimetry (MDSC) and tensile property analyses made of a spun cast film produced from the dispersion indicated that the polymer had a Tg of 47° C. and a tensile strength of 34.0 MPa (4927 psi) at 40% elongation.

Preparation G—Preparation of a Silyl Terminated Sulfo (polyester-urethane) with Tg of 28° C.

A sulfopolyester diol was prepared by heating 1 mole of DMSSIP with 4 moles of polyethylene glycol of molecular weight 400 substantially according to the procedure of Preparation A except that the reagents were charged as follows. A mixture of DMSSIP (277.7 g, 0.94 mol), polyethylene gylcol (1500 g, 3.75 mol, available from Union Carbide Corp.) was heated at 150° C. under vacuum for 1 hour, then nitrogen was admitted to the system and tetrabutyl titanate (1.33 g, available from Aldrich) was added. After heating at 220° C. for 4 hours and distilling methanol from the reaction mixture, the temperature was reduced to 175° C. and vacuum was applied for 30 minutes. The hydroxyl equivalent weight of the product sulfopolyester diol was determined to be 284 by the method of Preparation A.

A silyl terminated sulfo(polyester-urethane) was prepared from this sulfopolyester diol substantially according to the procedure of Preparation B except that the reagents were charged as follows:

The sulfopolyester diol described above (81.8 g, 0.14 mol), polycaprolactonediol (PCP 0201™, 47.2 g, 0.09 mol), ethylene glycol (14.9 g, 0.24 mol), isophorone diisocyanate (113.4 g, 0.51 mol), and 3-aminopropyltriethoxysilane (8.9 g, 0.04 mol) were allowed to react. Modulated Differential Scanning Calorimetry (MDSC) and tensile property analyses made of a spun cast film produced from the dispersion indicated that the polymer had a Tg of 28° C. and a tensile strength of 18.6 MPa (27.04 psi) at 702% elongation.

Preparation H—Preparation of a Silyl Terminated (Polyester-urethane) Substituted with Carboxy ($CO_2^-$) Groups Instead of Sulfo ($SO_3^-$) Groups.

A mixture of Tone™ A249 (163.4 g, 0.075 mol; Tone A249 is available from Union Carbide and is a monoacid functional diol with hydroxyl equivalent weight of 1079 that is prepared by chain extending dimethylolpropionic acid with epsilon-caprolactone), polycaprolactonediol (PCP™ 0201, 58.9 g, 0.11 mol), ethylene glycol (14.9 g, 0.24 mol), isophorone diisocyanate (105.9 g, 0.48 mol), and dibutyltin dilaurate (0.20 g, 0.3 mmol) were allowed to react in acetone until the isocyanate equivalent weight of the product reached 3179. Then a mixture of 3-aminopropyltriethoxysilane (18.0 g, 0.081 mol) and triethylamine (7.8 g, 0.077 mol) were added, followed by water (675 mL). Distillation of acetone and some water from the mixture left a dispersion (42% solids) of the carboxy substituted silanol terminated (polyester-urethane) in water. Modulated Differential Scanning Calorimetry (MDSC) and tensile property analyses made of a spun cast film produced from the dispersion indicated that the polymer had a Tg of 38° C. and a tensile strength of 5.1 MPa (742 psi) at 454% elongation.

Preparation I—Preparation of a Silyl Terminated Sulfo (polyester-urethane) from a Sulfopolyester Diol Different from the Sulfopolyester Diols Described in Preparation A and Preparation G.

The sulfopolyester diol used in this trial was Witco™ UCX SSTG-112-30, available from Crompton Corporation.

A mixture of Witco sulfo diol UCX SSTG-112-30 (146.7 g, 0.15 mol) polycaprolactonediol (PCP 0201™, 13.1 g, 0.025 mol), ethylene glycol (10.9 g, 0.18 mol), isophorone diisocyanate (86.1 g, 0.39 mol), and dibutyltin dilaurate (0.15 g, 0.2 mmol) were allowed to react in acetone until the isocyanate equivalent weight of the product reached 4558. Then 3-aminopropyltriethoxysilane (11.0 g, 0.05 mol) was added, followed by water (300 mL). Distillation of acetone and some water from the mixture left a dispersion (44% solids) of the silyl terminated sulfo(polyester-urethane) in water. Modulated Differential Scanning Calorimetry (MDSC) and tensile property analyses made of a spun cast film produced from the dispersion indicated that the polymer had a Tg of 6° C. and a tensile strength of 12.3 MPa (1785 psi) at 440% elongation.

In the Examples, weight % is relative to weight of solids in the dispersion.

EXAMPLE 1 (COMPARATIVE)

This example shows that the silyl terminated (polyester-urethane)s of Preparations B through I, and two commercially available non-silyl terminated waterborne polyurethane dispersions, Bayhydrol™ 123 (available from Bayer Corporation), and NeoRez™ R-9679 (available from NeoResins, Wilmington, Mass.) produced clear coatings on glass that were not peelable from the glass.

In separate trials, approximately 15 mL of the dispersion of the silyl terminated (polyester-urethane) of Preparations B through I or the polyurethane dispersions Bayhydrol™ 123 and NeoRez™ R-9679 were applied to an eight-path wet film applicator device, available from the Paul N. Gardner Co., Inc., Pompano Beach, Fla., and coated onto glass plates (10 cm by 20 cm by 0.48 cm; 4 inches by 8 inches by ³⁄₁₆ inches thick) at wet thicknesses of about 0.05 to 0.5 mm (2 to 20 mil) and widths of about 9 cm (3.5 in).

When dry, the clear, tough coatings could be scrapped off the glass in small sections with a razor blade, but they could not be peeled from the glass.

EXAMPLE 2

This example shows that when glycerol was added to the dispersions of the silyl terminated (polyester-urethane)s of Preparations B through I, and to two commercially available non-silyl terminated waterborne polyurethane dispersions, Bayhydrol 123 and NeoRez R9679, the dispersions produced clear coatings on glass that were easily removed in a sheet by peeling from the glass.

To 100 g of the silyl terminated sulfo(polyester-urethane) of Preparation B were added 2.4 g (5 weight percent) of glycerol. The mixture was agitated briefly by shaking, then allowed to stand at room temperature for 1 hour. The dispersion was coated onto glass plates at wet thicknesses of about 0.05 to 0.5 mm (2 to 20 mil) and allowed to dry to form clear, tough coatings which could be easily removed in a sheet by peeling from the glass plate. These examples were repeated except that 10 weight percent glycerol was added to the silyl terminated sulfo(polyester-urethane) of Preparation B. The dispersions were coated on glass plates as before and allowed to dry. The coatings could be easily peeled from the glass plate. The experiments were repeated with the silyl terminated sulfo(polyester-urethane)s of Preparations C through I and with the commercially available waterborne polyurethane dispersions. All coatings were easily peeled from the glass plates.

EXAMPLE 3

This example shows that the amount of force required to remove the dry, peelable coating varies with the amount of glycerol that was added to the dispersion. Peel adhesion (ASTM D 3330-78; PSTC-1 (11/75)) is the force required to remove a coated test specimen from a test panel measured at a specific angle and rate of removal. Peel adhesion was measured with an IMASS SP-2000 peel testing instrument, available from Instrumentor's, Inc., Strongsville, Ohio. In the trials, this force was expressed in Newtons per decimeter width (N/dm) of coated sheet and is the average of four determinations. The procedure followed was:
1) The polyurethane dispersion was coated onto a clean glass test plate (or other substrate) and completely dried. The coating was cut into 26 mm wide strips, and the end of the strip was peeled from the substrate.
2) The free end of the specimen was doubled back nearly touching itself so the angle of removal was 180°. The free end was attached to the adhesion tester scale.
3) The glass test plate was clamped in the jaws of the tensile testing machine which moved the plate away from the scale at a constant rate of 0.3 meters per minute.
4) The scale reading in Newtons ("Peel Value") was recorded as the coating was peeled from the glass surface.

| Trial | Release Additive | Wt % Release Additive | Dry Film Thickness | Peel avg, N/dm |
|---|---|---|---|---|
| 3-1 | glycerol[a] | 1 | 0.2 mm (8 mil) | 147.5 |
| 3-2 | glycerol[a] | 3 | 0.2 mm (8 mil) | 82.9 |
| 3-3 | glycerol[a] | 7 | 0.2 mm (8 mil) | 4.8 |
| 3-4 | glycerol[a] | 9 | 0.2 mm (8 mil) | 2.8 |
| 3-5 | glycerol[b] | 5 | 0.13 mm (5 mil) | 1.4 |
| 3-6 | glycerol[b] | 10 | 0.2 mm (8 mil) | 1.3 |
| 3-7 | glycerol[b] | 20 | 0.13 mm (5 mil) | 1.6 |
| 3-8 | glycerol[c] | 5 | 0.05 mm (2 mil) | 2.8 |

[a]silyl terminated sulfo(polyester-urethane) of Preparation C with a Tg of 12° C. was used in this Example.
[b]silyl terminated sulfo(polyester-urethane) of Preparation B with a Tg of 30° C. was used in this Example.
[c]silyl terminated sulfo(polyester-urethane) of Preparation I with a Tg of 6° C. was used in this Example.

EXAMPLE 4

This example shows the amount of force required to peel the coating of the silyl terminated sulfo(polyester-urethane) of Preparation C with a Tg of 12° C. containing 5 weight percent glycerol from various substrates at various film thicknesses.

| Trial | Substrate | Dry film thickness | Peel avg, N/dm |
|---|---|---|---|
| 4-1 | glass | 0.05 mm (2 mil) | 3.7 |
| 4-2 | glass | 0.10 mm (4 mil) | 3.9 |
| 4-3 | glass | 0.20 mm (8 mil) | 3.4 |
| 4-4 | glass | 0.30 mm (12 mil) | 4.8 |
| 4-5 | aluminum | 0.10 mm (4 mil) | 25.6 |
| 4-6 | polyester | 0.10 mm (4 mil) | 6.0 |
| 4-7 | ceramic tile | 0.10 mm (4 mil) | 2.8 |

EXAMPLE 5

This example shows the amount of force required to peel the coating of the silyl terminated sulfo(polyester-urethane) of Preparation C with a Tg of 12° C. containing other release additives than glycerol from a glass substrate. In all trials, film thickness was 0.20 mm (8 mil).

| Trial | Release Additive | Wt % Release Additive | Peel avg, N/dm |
|---|---|---|---|
| 5-1 | SC-PDMS-EO[a] | 5 | 24.1 |
| 5-2 | SC-PDMS-EO[a] | 4 | 62.7 |
| 5-3 | SC-PDMS-EO[a] | 6 | 77.4 |
| 5-4 | SC-PDMS-EO[a] | 7 | 81.8 |
| 5-5 | SC-PDMS-EO[a] | 8 | 88.3 |
| 5-6 | SC-PDMS-EO[a] | 10 | 50.6 |
| 5-7 | Block-PDMS-EO[b] (1) | 5 | 33.0 |
| 5-8 | Block-PDMS-EO[c] (2) | 5 | 63.0 |
| 5-9 | PEG 600[d] | 5 | 94.0 |
| 5-10 | PEG 2000[e] | 5 | 43.1 |
| 5-11 | triethylene glycol[f] | 5 | 153.3 |
| 5-12 | PEG 2000 monomethyl ether[f] | 5 | 64.1 |
| 5-13 | PEG 5000 mono methyl ether[f] | 5 | 32.3 |
| 5-14 | pentaerythritol ethoxylate (1:3)[g] | 5 | 92.3 |
| 5-15 | pentaerythritol ethoxylate (1:5)[h] | 5 | 62.1 |

-continued

| Trial | Release Additive | Wt % Release Additive | Peel avg, N/dm |
|---|---|---|---|
| 5-16 | pentaerythritol ethoxylate (1:15)[i] | 5 | 60.0 |
| 5-17 | ethylene glycol[f] | 5 | j |
| 5-18 | Diethylene glycol[f] | 5 | j |
| 5-19 | Jonwax™ 26[k] | 5 | 121.2 |
| 5-20 | Jonwax 26[k] | 10 | 108.2 |
| 5-21 | Actrasol™ C75[l] | 5 | 146.8 |
| 5-22 | Actrasol C75[l,m] | 5 | 47.5 |

[a]SC-PDMS-EO is poly[dimethylsiloxane-co-methyl(3-hydroxypropyl)siloxane]-graft-poly(ethylene/propylene glycol); Aldrich catalog number 45,798-1
[b]Block-PDMS-EO (1) is poly(dimethylsiloxane) ethoxylated, hydroxypropoxylate end-capped; Aldrich catalog number 48,271-4
[c]Block-PDMS-EO (2) is poly(dimethylsiloxane) ethoxylated, dihydroxy terminated; Aldrich catalog number 48,322-2
[d]PEG™ 600 is poly(ethylene glycol) of 600 number average molecular weight, available from Aldrich.
[e]PEG 2000 is poly(ethylene glycol) of 2000 number average molecular weight, available from Aldrich.
[f]available from Aldrich.
[g]pentaerythritol ethoxylate (1:3) is pentaerythritol ethoxylated with 3 moles of ethylene oxide, number average molecular weight 270, available from Aldrich.
[h]pentaerythritol ethoxylate (1:5) is pentaerythritol ethoxylated with 5 moles of ethylene oxide, number average molecular weight 355, available from Perstorp Polyols, Inc., Toledo, OH.
[i]pentaerythritol ethoxylate (1:15) is pentaerythritol ethoxylated with 15 moles of ethylene oxide, number average molecular weight 797, available from Perstorp Polyols, Inc., Toledo, OH.
[j]adhesion was too great for films to be peeled from the substrate.
[k]Jonwax 26 is a 26% solids polyethylene/paraffin wax emulsion, available from S. C. Johnson Company, Racine, WI; weight percent of the Jonwax 26 used with the silyl terminated sulfo(polyester-urethane) refers to weight of Jonwax 26 solids relative to urethane dispersion solids.
[l]Actrasol C75 is a sulfated castor oil available from Actrachem, Bedford Park, IL.
[m]silyl terminated sulfo(polyester-urethane) of Preparation B with a Tg of 30° C. was used in this example.

EXAMPLE 6

This example shows the amount of force required to peel the coating of some commercially available non-silyl terminated waterborne polyurethane dispersions containing 5 weight percent glycerol from a glass substrate. In all trials, film thickness was 0.13 mm (5 mil).

| Trial | Polyurethane Dispersion | Peel avg, N/dm |
|---|---|---|
| 6-1 | Bayhydrol 110 | 7.2 |
| 6-2 | Bayhydrol 123 | 4.3 |
| 6-3 | Bayhydrol PR 240 | 4.2 |
| 6-4 | Bayhydrol 140 AQ | 4.0 |
| 6-5 | Witcobond W-232 | 1.9 |
| 6-6 | Witcobond W-505 | 6.0 |
| 6-7 | Witcobond W-507 | 0.5 |
| 6-8 | NeoRez R-972 | 2.0 |
| 6-9 | NeoRez R-960 | 1.4 |
| 6-10 | NeoRez R-9367 | 1.7 |
| 6-11 | NeoRez R-9649 | 0.6 |
| 6-12 | NeoRez R-9679 | 0.9 |

EXAMPLE 7

This example shows the preparation of a rheologically modified (thickened) formulation with good wetting characteristics that was useful for producing thick coatings or for coating surfaces with low surface energy or for coating objects by dipping.

To 12.1 kg of the silyl terminated sulfo(polyester-urethane) dispersion of Preparation B (46% solids, viscosity of 52 centipoise as measured with a Brookfield Model DV-II+ viscometer, available from Brookfield Engineering Laboratories, Inc., Middleboro, Mass. with an LV-3 spindle at 50 rpm) in a 19 liter (5 gallon) carboy were added glycerol (275 g), ethanol (1240 g), and Rheolate™ 278 (162 g; Rheolate 278 is a rheological modifier available from Rheox, Inc., Hightstown, N.J.). The mixture was agitated for one hour by tumbling and then allowed to stand overnight at room temperature. Viscosity of the formulated dispersion was determined to be 1812 centipoise as measured with the Brookfield LV-3 spindle at 50 rpm.

A hemispherically shaped stainless steel stirring blade, approximate measurements 18 cm by 3.8 cm by 0.15 cm thick (7 inches by 1.5 inches by 0.0625 inches thick) and a 5 iron golf club head were separately coated with the formulated dispersion by dipping. The coatings were dried by placing the objects in an oven at a temperature of 80° C. for 1 hour. The objects were removed from the oven and allowed to cool to room temperature. The coatings (approximate film thickness 0.40–0.48 mm; 15–19 mil) were easily removed by peeling from the objects.

EXAMPLE 8

This example shows the use of higher boiling oligomers of glycerol to provide peelable coatings that remain removable when the coatings have been heated for extended periods of time.

Dispersions with 5 weight percent of the specified release additive were prepared from the silyl terminated sulfo (polyester-urethane) dispersion of Preparation C and either glycerol, triglycerol, or hexaglycerol. Triglycerol and hexaglycerol are available from Hexagon Enterprises, Inc., under the tradenames Hexapol G-3™ and Hexapol G-6™, respectively. Hexapol G-3 has the following approximate composition: glycerol, 13%; diglycerol, 17%; triglycerol, 51%; tetraglycerol, 11%; pentaglycerol, 5%; other glycerols, remainder. Hexapol G-6 has the following approximate composition: diglycerol, 6%; triglycerol, 28%; hexaglycerol, 64%; other glycerols, remainder. The Hexapol G-3 and Hexapol G-6 materials were dissolved in a small amount of water before mixing with the silyl terminated sulfo(polyester-urethane) dispersion.

The dispersions were coated onto glass plates at wet thicknesses of approximately 0.13 mm (5 mil), allowed to dry at room temperature, and then the coated plates were placed in an oven at 60° C. Removability of the dried films was investigated by periodically removing the coated plates from the oven, allowing to cool to room temperature, slicing a 10 cm (0.4 inch) wide strip of the film with a razor blade, and peeling the film from the glass. If the films were peelable, the coated plates were then returned to the oven for longer aging. It was found that the film from the glycerol containing dispersion was still peelable up to about 4 days in the 60° C. oven. The film from the dispersion containing Hexapol G-3 was peelable up to about 140 days in 60° C. oven, and the film from the dispersion containing Hexapol G-6 remained peelable after 180 days in the 60° C. oven.

EXAMPLE 9

This example shows the use of the temporary protective coatings of the present invention for the protection of plastic sheeting during a thermoforming operation.

After the thermoforming operation, the protective coatings were peeled from the thermoformed plastic sheeting. The thermoforming device utilized was a Formech™ 450 vacuum thermoforming machine, available from Formech, Inc., Kings Park, N.Y. The plastic sheeting, approximately 20 cm by 20 cm (8 inches by 8 inches), was coated with the dispersion at wet thicknesses of approximately 0.25–0.30 mm (10–12 mil). Temperature controls of the three heating zones of the Formech 450 were set to high. The mold objects used were either a wooden wedge of approximate dimensions 7.6 cm by 3.8 cm by 3.8 cm (3 inches by 1.5 inches by 1.5 inches) or a Teflon™ dome, 7.6 cm diameter by 2.5 cm high (3 inch by 1 inch). The coated pieces of plastic sheet were clamped into the forming area of the thermoforming machine, either with the coated side of the sheet up (towards the heating element, and away from the mold object), or with the coated side of the sheet down (towards the mold object). The heating element was moved into place and the plastic sheeting was heated until it visibly started to soften, as observed from the viewing port. The heating element was then removed, the mold object was raised into the plastic sheet, and vacuum was applied until the plastic sheeting conformed to the mold object. Vacuum was released, and the coated, thermoformed sheet was removed. After cooling to room temperature, the temporary protective film could be peeled from the plastic sheeting. When the plastic sheeting was thermoformed with the protective coating towards the mold object, it was seen upon removal of the protective coating film that the film had protected the surface of the plastic sheeting from abrasion or loss of gloss.

The types of plastic sheeting (available from McMaster-Carr Supply Co., Elmhurst, Ill.), used in these trials were acrylonitrile-butadiene-styrene (ABS, 0.60 mm (23 mil) thickness), high impact polystyrene (HIPS, 0.80 mm (31 mil) thickness), polypropylene (1.6 mm (63 mil) thickness), polyethylene terephthalate co-polymer (PETG, 1.6 mm (63 mil) thickness), polycarbonate (1.6 mm (63 mil) thickness), polymethyl methacrylate (PMMA, 0.80 mm (31 mil) thickness), and polyvinyl chloride, type 1 (PVC, 1.6 mm (63 mil) thickness).

The following table indicates the types of plastic substrates that were coated with the temporary protective coatings of the present invention and then thermoformed. The protective coating films were easily peeled from the plastic substrates.

| Trial | Substrate | Coating formulation | Dry film thickness |
| --- | --- | --- | --- |
| 9-1 | ABS | AA | 0.05 mm, 2 mil[a] |
| 9-2 | ABS | AA | 0.15 mm, 6 mil[b] |
| 9-3 | ABS | AA | 0.15 mm, 6 mil[c] |
| 9-4 | ABS | BB | 0.15 mm, 6 mil[c] |
| 9-5 | ABS | CC | 0.15 mm, 6 mil[c] |
| 9-6 | ABS | DD | 0.15 mm, 6 mil[c] |
| 9-7 | ABS | EE | 0.15 mm, 6 mil[c] |
| 9-8 | ABS | FF | 0.15 mm, 6 mil[c] |
| 9-9 | ABS | GG[e] | 0.15 mm, 6 mil[c,d] |
| 9-10 | ABS | HH[e] | 0.15 mm, 6 mil[c] |
| 9-11 | ABS | II[e] | 0.15 mm, 6 mil[c] |
| 9-12 | ABS | JJ[e] | 0.15 mm, 6 mil[c] |
| 9-13 | ABS | KK[e] | 0.15 mm, 6 mil[c] |
| 9-14 | ABS | LL[e] | 0.15 mm, 6 mil[c] |
| 9-15 | ABS | MM[e] | 0.15 mm, 6 mil[c] |
| 9-16 | ABS | NN[e] | 0.15 mm, 6 mil[c] |
| 9-17 | ABS | OO[e] | 0.15 mm, 6 mil[c] |
| 9-18 | ABS | PP[e] | 0.15 mm, 6 mil[c,d] |
| 9-19 | ABS | QQ[e] | 0.15 mm, 6 mil[c,d] |
| 9-20 | ABS | RR[e] | 0.15 mm, 6 mil[c,d] |
| 9-21 | HIPS | FF | 0.15 mm, 6 mil[c] |
| 9-22 | PETG | EE | 0.20 mm, 8 mil[c] |
| 9-23 | polycarbonate | EE | 0.20 mm, 8 mil[c] |
| 9-24 | PMMA | EE | 0.20 mm, 8 mil[c] |
| 9-25 | polypropylene | DD | 0.20 mm, 8 mil[c] |

AA = coating formulation was prepared by mixing the silyl terminated sulfo(polyester-urethane) of Preparation C with a Tg of 12° C. (420 g of a 45% solids dispersion) with glycerol (19 g), ethanol (42 g), and Rheolate ™ 278 (5.7 g).
BB = coating formulation was prepared by mixing the silyl terminated sulfo(polyester-urethane) of Preparation C with a Tg of 12° C. (420 g of a 45% solids dispersion) with glycerol (9 g), Hexapol G-3 (9 g), ethanol (42 g), and Rheolate 278 (5.7 g).
CC = coating formulation was prepared by mixing the silyl terminated sulfo(polyester-urethane) of Preparation C with a Tg of 12° C. (420 g of a 45% solids dispersion) with Hexapol G-3 ™ (19 g), ethanol (42 g), and Rheolate 278 (5.7 g).
DD = coating formulation was prepared by mixing the silyl terminated sulfo(polyester-urethane) of Preparation C with a Tg of 12° C. (420 g of a 45% solids dispersion) with glycerol (9 g), Hexapol G-6 ™ (9 g), ethanol (42 g), and Rheolate 278 (5.7 g).
EE = coating formulation was that of Example 7.
FF = coating formulation was prepared by mixing the silyl terminated sulfo(polyester-urethane) of Preparation B with a Tg of 30° C. with 5 weight percent (relative to percent solids) of glycerol.
GG = coating formulation was prepared by mixing Bayhydrol 123 (100 g) with glycerol (4.0 g), ethanol (10 g), and Rheolate 278 (1.2 g).
HH = coating formulation was prepared by mixing Bayhydrol 110 (50 g) with glycerol (2.0 g), ethanol (5 g), and Rheolate 278 (0.6 g).
II = coating formulation was prepared by mixing Bayhydrol PR240 (50 g) with glycerol (2.0 g), ethanol (5 g), and Rheolate 278 (0.6 g).
JJ = coating formulation was prepared by mixing Bayhydrol 140AQ (50 g) with glycerol (2.0 g), ethanol (5 g), and Rheolate 278 (0.6 g).
KK = coating formulation was prepared by mixing NeoRez R-9679 (75 g) with glycerol (3 g), ethanol (7.5 g), and Rheolate 278 (0.9 g).
LL = coating formulation was prepared by mixing NeoRez R-960 (50 g) with glycerol (1.6 g), ethanol (5 g), and Rheolate 278 (0.5 g).
MM = coating formulation was prepared by mixing NeoRez R-972 (50 g) with glycerol (1.7 g), ethanol (5 g), and Rheolate 278 (0.5 g).
NN = coating formulation was prepared by mixing NeoRez R-9649 (50 g) with glycerol (1.8 g), ethanol (5 g), and Rheolate 278 (0.5 g).
OO = coating formulation was prepared by mixing NeoRez R-9637 (50 g) with glycerol (1.8 g), ethanol (5 g), and Rheolate 278 (0.5 g).
PP = coating formulation was prepared by mixing Witcobond W-232 (50 g) with glycerol (1.6 g), ethanol (5 g), and Rheolate 278 (0.5 g).
QQ = coating formulation was prepared by mixing Witcobond W-505 (50 g) with glycerol (1.6 g), ethanol (5 g), and Rheolate 278 (0.6 g).
RR = coating formulation was prepared by mixing Witcobond W-507 (50 g) with glycerol (3.0 g), ethanol (5 g), and Rheolate 278 (0.9 g).
[a]coated side was away from mold object (wooden wedge).
[b]coated side was towards the mold object (wooden wedge).
[c]coated side was towards the mold object (Teflon dome).
[d]film could only be removed in small sections, it was too elongatable to be easily peeled in a large section from the ABS.
[e]non-silyl terminated polyurethane dispersion.

EXAMPLE 10

This example shows the use of a silyl terminated sulfo (polyester-urethane) dispersion including glycerol to provide removable coatings on thermoplastic films.

A silyl terminated sulfo(polyester-urethane) dispersion was prepared essentially as described in Preparation B except as follows:

A mixture of the sulfopolyesterdiol of Preparation A with a hydroxyl equivalent weight of 323 (34.1 kg, 52.8 mol), PCP 0201 (15.2 kg, 28.7 mol), ethylene glycol (4.1 kg, 66 mol), isophorone diisocyanate (36.5 kg, 164.2 mol), and acetone (96 kg) was heated to 85° C. and held at this temperature under 377 KPa of pressure. The temperature and pressure were then reduced to 60° C. and 115 KPa, respectively, and 3-aminopropyltriethoxysilane (5.4 kg, 24.6 mol) was added to the resulting mixture and allowed to react with the mixture for 15 minutes. The resulting acetone solution and deionized water were metered at 5.8 kg/min and 2.9 kg/min, respectively, into a high-shear mixing cavity of a Silverson 275 LS rotor stator mixer (Silverson Machines, Inc. of East Longmeadow, Mass.), forming a dispersion. The acetone was then distilled from the mixture under reduced pressure to produce a dispersion (48% solids) of silyl terminated sulfo(polyester-urethane) in water.

Dispersions with approximately 2.5 and 5 weight percent glycerol in the above silyl terminated sulfo(polyester-urethane) dispersion were prepared. These were coated out on 3M Radiant Mirror Film™ (66 micrometer poly(ethylene naphthalenedicarboxylate) multilayer film available from 3M, St. Paul, Minn.) (PEN) and 3M Scotchpar™ (50.8 micrometer poly(ethylene terephthalate) film available from 3M, St. Paul, Minn.) (PET) using a number 36 wire-wound coating rod (available from RD Specialties, Webster, N.Y.). The resulting coated films were placed in a 121° C. oven for one minute. After allowing the coated films to return to room temperature, all of the resulting dry coatings were found to be relatively easy to remove by peeling the coating from the film. Dry coating thickness was found to be about 34 micrometers when one pass with the coating rod was used. Thicker coatings were also made using two and three passes with the coating rod (approximately 68 micrometers and 102 micrometers, respectively) with oven drying as above after each pass. In general, it was found that the thicker the coating, the easier it was to peel from the film. All coatings were peelable by hand.

EXAMPLE 11

This example shows the use of the temporary protective coatings of the present invention for the protection of thermoplastic films before, during, and after biaxial orientation. After biaxial orientation the protective coatings were stripped from the oriented film using an adhesive tape to grip the film because of the thinness of the resulting protective coating.

Dispersions with 1.25, 2.5, 3.75, and 5 weight percent glycerol in the silyl terminated sulfo(polyester-urethane) dispersion of Example 10 were prepared. The resulting glycerol-containing dispersions were coated onto 1.02 mm thick poly(ethylene terephthalate) cast web prepared by extruding the poly(ethylene terephthalate) onto a cooled roll and collecting the resulting film on a roll. The dispersions were coated on the film with a coating rod and dried as above in Example 10. The resulting coated films were then stretched in a laboratory biaxial stretching device to a total film stretch ratio of 6:1, (2:1 in the transverse direction and 3:1 in the machine direction). Final thicknesses of the resulting coatings were approximately 5 to 8 micrometers. The coatings were contacted with Scotch® 351 tape (available from 3M, St. Paul, Minn.) and then peeled from the films by pulling the tape. All of the coatings were easily peeled from the films.

EXAMPLE 12

Dispersions with 2.5 weight percent of the specified release additive were prepared from the silyl terminated sulfo(polyester-urethane) dispersion of Example 10 and either glycerol, poly(ethylene glycol) of 400 number average molecular weight, poly(ethylene glycol) methyl ether of 350 number average molecular weight, pentaerythritol ethoxylated with 3 moles of ethylene oxide of 270 number average molecular weight, or hexaglycerol.

The resulting dispersions were coated onto PEN film and dried at either 143° C. for 3 minutes or 221° C. for 20 seconds. Various dry coating thicknesses were utilized, ranging from 6 to 51 micrometers. All of the coatings were peeled from the films.

Various modifications and alterations that do not depart from the scope band intent of this invention will become apparent to those skilled in the art. This invention is not to be unduly limited to the illustrative embodiments set forth herein.

It is claimed:

1. A process comprising the step of:
   providing a composite article comprising
   1) a nonporous substrate having on at least one surface thereof
   2) a dry-strippable protective dried water-borne polyurethane coating composition, said polyurethane composition being free of foam and free of polymerizable acrylate functionality, said composition comprising a release additive including one or both of (a) a releasing co-solvent having a boiling point greater than 100° C., and (b) a dispersion of a metal salt of stearic acid or a dispersion of a wax, said polyurethane coating composition being a film, and wherein said polyurethane comprises one or more of a silyl-terminated polyurethane, a sulfopoly(ester-urethane) which optionally is terminated by one or more silyl groups, and a sulfonate functional polyurethane urea, and
   3) removing said protective film by stripping it from said substrate in the absence of a stripping agent.

2. The process according to claim 1 wherein said polyurethane comprises a sulfonate functional polyurethane urea.

3. The process according to claim 1 wherein said release additive comprises a hydrophilic polyol.

4. The process according to claim 3 wherein said hydrophilic polyol comprises glycerol or an oligomer of glycerol.

5. The process according to claim 3 wherein said hydrophilic polyol comprises one or more of an ether of ethylene glycol, an ester of ethylene glycol, polyethylene glycol, an ether of polyethylene glycol, an ester of polyethylene glycol, and pentaerythritol ethoxylate.

6. The process according to claim 1 wherein said releasing co-solvent comprises one or more of castor oil, sulfonated castor oil, and ethoxylated polydimethylsiloxane.

7. The process according to claim 1 wherein said release additive is present in said coating composition in an amount in the range of 0.5 to 20 weight percent relative to the weight of solids in said polyurethane dispersion.

8. The process according to claim 7 wherein the amount of release additive is present in the range of 5 to 10 weight percent relative to the weight of solids in said polyurethane dispersion.

9. The process according to claim 1 wherein said substrate comprises one or more of plastic, metal, glass, and ceramic.

10. The process according to claim 1 wherein said substrate comprises a thermoplastic film.

11. The process according to claim 1 wherein said substrate comprises a thermoformable material.

12. The process according to claim 11 wherein said thermoformable material comprises a plastic material.

13. The process according to claim 10 wherein said thermoplastic film comprises one or more of acrylonitrile butadiene styrene polymer, high impact polystyrene, polyethylene, polypropylene, poly(ethylene terephthalate) and copolymers thereof, polymethylmethacrylate, poly(ethylene naphthalenedicarboxylate), polycarbonate, polycarbonate-polyetherimide, and polyvinyl chloride.

14. The process according to claim 11 further comprising the step of thermoforming said composite article into a desired shape.

15. The process according to claim 14 wherein the steps of thermoforming said composite article and removing said protective film from said substrate produce a thermoformed substrate.

16. A coating composition comprising an aqueous polyurethane composition, said polyurethane composition being free of foam and free of acrylate functionality, said polyurethane including a release additive comprising one or both of (a) an amount in the range of 0.5 to 20 weight percent, relative to the weight percent of solids in the polyurethane composition, of a releasing co-solvent having a boiling point greater than 100° C., and (b) a dispersion of a metal of stearic acid salt or a dispersion of a wax, said coating composition when dried being a dry-strippable film, and wherein said polyurethane comprises one or more of a silyl-terminated polyurethane, a sulfopoly(ester-urethane) which optionally is terminated by one or more silyl groups, and a sulfonate functional polyurethane-urea.

17. The coating composition according to claim 16 wherein said release additive comprises one or more of glycerol, an oligomer of glycerol, an ether of ethylene glycol, an ester of glycerol, polyethylene glycol, an ether of polyethylene glycol, an ester of polyethylene glycol, pentaerythritol ethoxylate, castor oil, sulfonated castor oil, a dispersion of a metal salt of stearic acid, ethoxylated polydimethylsiloxane, and a dispersed wax.

18. The coating composition according to claim 16 from which water has been removed to provide a dry-strippable polyurethane coating.

19. The polyurethane coating according to claim 17 wherein said release additive comprises glycerol or an oligomer of glycerol.

20. A composite article comprising
a) a nonporous substrate having on at least one surface thereof
b) a dry-strippable protective dried water-borne polyurethane coating composition, said polyurethane coating composition being free of foam and free of acrylate functionality, said coating composition comprising a release additive including one or both of (a) an amount in the range of 0.5 to 20 weight percent, relative to the weight of solids in the polyurethane composition, of a releasing co-solvent having a boiling point greater than 100° C., and (b) a dispersion of a metal salt of stearic acid or a dispersion of a wax, said polyurethane coating composition being a film, and wherein said polyurethane comprises one or more of a silyl-terminated polyurethane, a sulfopoly(ester-urethane) which optionally is terminated by one or more silyl groups, and a sulfonate functional polyurethane-urea.

21. The composite article according to claim 20 wherein said substrate comprises a thermoformable material.

22. The composite article according to claim 21 which has been thermoformed to produce a shaped article.

23. The composite article according to claim 22 wherein said thermoforming comprises one or more of heating, pressing, stretching, and application of vacuum.

24. The composite article according to claim 20 wherein said release additive comprises one or more of glycerol or an oligomer thereof, an ether of ethylene glycol, an ester of ethylene glycol, polyethylene glycol, an ether of polyethylene glycol, an ester of polyethylene glycol, pentaerythritol ethoxylate, castor oil, sulfonated castor oil, a metal salt of stearic acid, ethoxylated polydimethylsiloxane, and a dispersed wax.

25. The composite article according to claim 20 wherein said substrate comprises one or more of plastic, metal, glass, sealed wood, and ceramic.

26. The composite article according to claim 22 wherein said substrate comprises a plastic material.

27. A process comprising the step of:
a) providing a composite article comprising
1) a nonporous substrate having on at least one surface thereof
2) a strippable protective dried water-borne polyurethane coating composition comprising a release additive including one or both of (a) a releasing co-solvent having a boiling point greater than 100° C., and (b) a dispersion of a metal salt of stearic acid or a dispersion of a wax, and
b) thermoforming said composite article into a desired shape.

28. A coating composition comprising an aqueous polyurethane dispersion including a release additive comprising one or both of (a) an amount in the range of 0.5 to 20 weight percent, relative to the weight of solids in the polyurethane dispersion, of a releasing co-solvent having a boiling point greater than 100° C., and (b) a dispersion of a metal salt or a dispersion of a wax, wherein said polyurethane comprises a sulfopoly(ester-urethane) which optionally is terminated with one or more silyl groups, said coating composition when dried being dry-strippable from a nonporous substrate.

29. The process according to claim 27 wherein said polyurethane comprises one or more of a silyl-terminated polyurethane, a sulfopoly(ester-urethane) which optionally is terminated by one or more silyl groups, and a carboxylate or sulfonate functional polyurethane-urea.

30. The process according to claim 27 further comprising the step of dry-stripping said protective coating from said substrate to produce a thermoformed substrate.

31. The process according to claim 30 wherein said thermoformed substrate comprises a plastic material.

32. The process according to claim 30 wherein said thermoformed substrate comprises one or more of acrylonitrile butadiene styrene polymer, high impact polystyrene, polyethylene, polypropylene, poly(ethylene terephthalate) and copolymer thereof, polycarbonate, polycarbonate-polyetherimide, polymethyl methacrylate, poly(vinylchloride), poly(ethylene naphthalenedicarboxylate), and cellulosics.

33. The process according to claim 27 wherein said release additive of said polyurethane coating composition comprises one or more of glycerol or an oligomer thereof, an ether of ethylene glycol, an ester of ethylene glycol, polyethylene glycol, an ether of polyethylene glycol, an ester of polyethylene glycerol, pentaerythritol ethoxylate, castor oil, sulfonated castor oil, a dispersion of a metal salt of stearic acid, ethoxylated polydimethylsiloxane, and a dispersed wax.

34. A process comprising the step of:
providing a composite article comprising:
1) a nonporous substrate having on at least one surface thereof
2) a dry-strippable protective dried water-borne polyurethane coating composition produced from an aqueous polyurethane dispersion, said polyurethane composition being free of foam and free of polymerizable acrylate functionality, said coating composition comprising a release additive comprising one or both of (a) an amount in the range of 0.5 to 20 weight percent, relative to the weight of solids in the polyurethane dispersion, of a releasing co-solvent having a boiling point greater than 100 degrees C., said releasing co-solvent comprising a hydrophilic polyol, and (b) one or more of castor oil, sulfonated castor oil, an ethoxylated polydimethylsiloxane, a dispersion of a metal salt of stearic acid, and a dispersed wax, said polyurethane coating composition being a film, and 3) optionally, removing said protective film by stripping it from said substrate in the absence of a stripping solvent.

* * * * *